(12) United States Patent
Tai et al.

(10) Patent No.: US 7,181,697 B2
(45) Date of Patent: Feb. 20, 2007

(54) METHOD OF IMPLEMENTING A PLURALITY OF SYSTEM TRAY AREAS

(75) Inventors: Lu-Yun Tai, Taoyuan (TW); Hung-Ming Chen, Taipei (TW)

(73) Assignee: Tatung Co., Ltd., Taipei (TW)

( * ) Notice: Subject to any disclaimer, the term of this patent is extended or adjusted under 35 U.S.C. 154(b) by 792 days.

(21) Appl. No.: 10/309,285

(22) Filed: Dec. 4, 2002

(65) Prior Publication Data
US 2004/0061723 A1    Apr. 1, 2004

(30) Foreign Application Priority Data
Sep. 26, 2002  (TW) ............................. 91122197 A

(51) Int. Cl.
*G06F 3/00*  (2006.01)
(52) U.S. Cl. ...................... 715/779; 715/835
(58) Field of Classification Search ........ 715/778–779, 715/777, 776, 835, 840, 810
See application file for complete search history.

(56) References Cited

U.S. PATENT DOCUMENTS

| | | | |
|---|---|---|---|
| 5,757,371 A * | 5/1998 | Oran et al. ................. | 715/779 |
| 5,825,357 A * | 10/1998 | Malamud et al. ........... | 715/779 |
| 6,356,284 B1 * | 3/2002 | Manduley et al. .......... | 715/779 |
| 6,493,002 B1 * | 12/2002 | Christensen ................ | 715/779 |
| 6,549,217 B1 * | 4/2003 | De Greef et al. ........... | 715/745 |
| 6,593,945 B1 * | 7/2003 | Nason et al. ............... | 715/779 |
| 6,661,435 B2 * | 12/2003 | Nason et al. ............... | 715/778 |
| 6,704,031 B1 * | 3/2004 | Kimball et al. ............. | 715/745 |
| 6,756,999 B2 * | 6/2004 | Stoakley et al. ............ | 715/779 |
| 6,781,611 B1 * | 8/2004 | Richard ...................... | 715/779 |
| 6,883,143 B2 * | 4/2005 | Driskell ...................... | 715/763 |
| 2005/0278647 A1 * | 12/2005 | Leavitt et al. .............. | 715/765 |

OTHER PUBLICATIONS

Screendumps (Windows XP System Trays; 1 page).*
Download Internet Explorer 6 Service Pack 1 (2 pages).*

* cited by examiner

*Primary Examiner*—Sy D. Luu
(74) *Attorney, Agent, or Firm*—Bacon & Thomas, PLLC

(57) ABSTRACT

A method of implementing a plurality of system tray areas is disclosed, wherein each system tray area is defined with a particular size and used for displaying a plurality of registered icons to enable a user to select one icon to execute a corresponding system tray function, a first system tray area having a size that is larger than the size of a second system tray area. The method includes: initiating installation of an operating system in a computer system, wherein the computer system has a shell program, the shell program being used for interpreting and executing a command given from a user of the operating system; calling the shell program; and executing the shell program to enable a display of the computer system to display at least two system tray areas.

7 Claims, 5 Drawing Sheets

METHOD OF IMPLEMENTING A PLURALITY OF SYSTEM TRAY AREAS

BACKGROUND OF THE INVENTION

1. Field of the Invention

The present invention relates to a method of implementing a plurality of system tray areas and, more particularly, to a method of implementing system tray areas in a shell program, which is suitable for an intelligent apparatus having a system tray area.

2. Description of the Related Art

In the display of the typical information apparatus, a row of menus along a bottom portion of the display screen is called toolbar, and a system tray area is placed on the right side of the toolbar and is used for displaying various icons within the system tray area, such as icons that call programs for printer and volume control, input device settings, network status information, time settings or other external programs, which enable a user to click on the icons to quickly execute the associated program.

However, size of the icon for the prior art system tray area is defined as a 16×16 pixel area, and is often too small for the user. The user has to first precisely move the mouse pointer onto the icon and then click to execute the associated program, which is very inconvenient.

The above-mentioned problem is even more obvious on a pen-based device, such as a tablet PC or a personal digital assistant (PDA), etc. These apparatuses utilize a touch pen or a finger to touch a panel to provide input. But there is a little gap between the panel and a sensor for receiving the touch signal from the panel, which results in inaccuracy between a coordinate value selected by the touch pen or the finger and a coordinate value detected by the sensor. Therefore, due to small icon sizes and the narrow spacing between the icons, it is difficult for the user to select an icon on the system tray area. For example, the user may want to select the icon for volume control, but the sensor of the pen-based device generates a touch signal for the input device control icon.

Furthermore, in a single system tray area, it is impossible to separate the icons related to functionality from those icons that simply display a state (i.e., a power state); and the operating mode is not adjustable.

Therefore, it is desirable to provide an improved method for implementing system tray areas to mitigate and/or obviate the aforementioned problems.

SUMMARY OF THE INVENTION

The main objective of present invention is to provide a method of implementing a plurality of system tray areas, which supports icons of different sizes for different system tray areas, to make it easy for the user to select an icon to execute a corresponding function.

Another objective of the present invention is to provide a method of implementing a plurality of system tray areas, which can specify an icon to a particular system tray area according to a request, to improve design practicality and flexibility.

Another objective of the present invention is to provide a method of implementing a plurality of system tray areas, which can modify the size of an icon in a database to adjust dispositions among all icons within the system tray area.

In order to achieve the above-mentioned objective, the present invention provides a method of implementing a plurality of system tray areas wherein each system tray area is defined with a particular size and used for displaying a plurality of registered icons to enable a user to select one icon to execute a corresponding system tray function, a first system tray area having a size that is larger than the size of a second system tray area. The method comprises initiating installation of an operating system in a computer system, wherein the computer system has a shell program, the shell program being used for interpreting and executing a command given from a user of the operating system; calling the shell program; and executing the shell program to enable a display of the computer system to display at least two system tray areas.

An execution process of the present invention can be completed by a software program, the present invention can be written in an appropriate computer language to be loaded onto a computer readable medium. The medium can be an IC chip, a hard disk, an optical disk or any other software recording medium, but random access memory is considered a better choice as it is easy to update.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
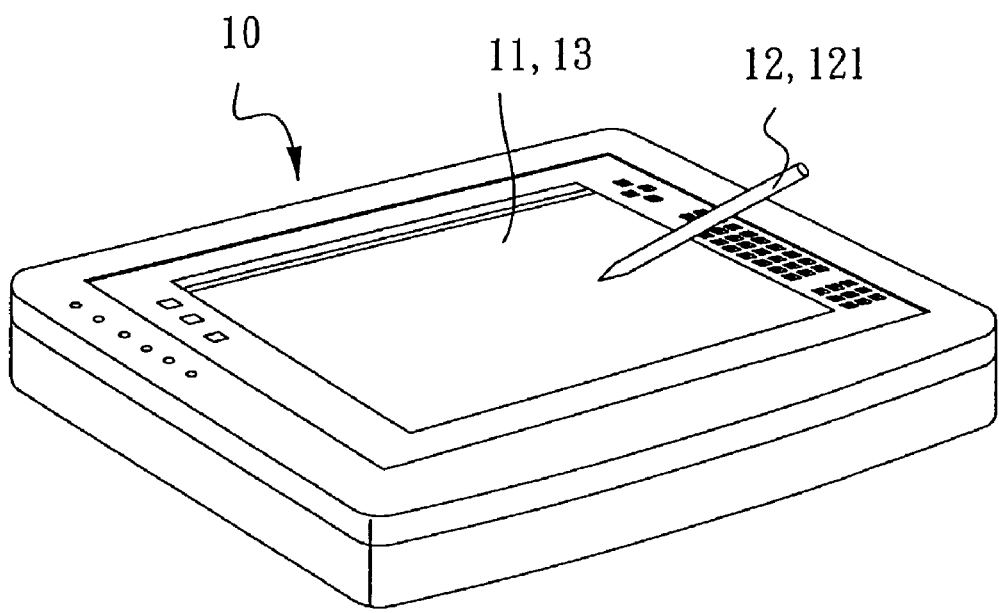
FIG. 1 is a schematic drawing of a practicing environment according to the present invention.

Please refer to FIG. 1. FIG. 1 is a schematic drawing of a practicing environment according to the present invention. In this embodiment, a tablet PC 10 comprises a pen-based panel 11, operating with an input device 12, and is used for performing signal inputting functionality thereon. The input device 12 is a touch pen 121 (also called a handwriting pen), but a user can also use a finger or a pen-point as an input end. Furthermore, the embodiment can also be applied in an equivalent pen-based apparatus, such as a personal digital assistant (PDA), a pocket PC, etc. The tablet PC 10 utilizes the Windows CE.NET operation system; a shell program is the explorer.exe application program, which is used for interpretation and execution of commands obtained from the user to the operation system. Hence, the pen-based panel 11 displays a desktop 13 with a plurality of system tray areas.

Figure 2:
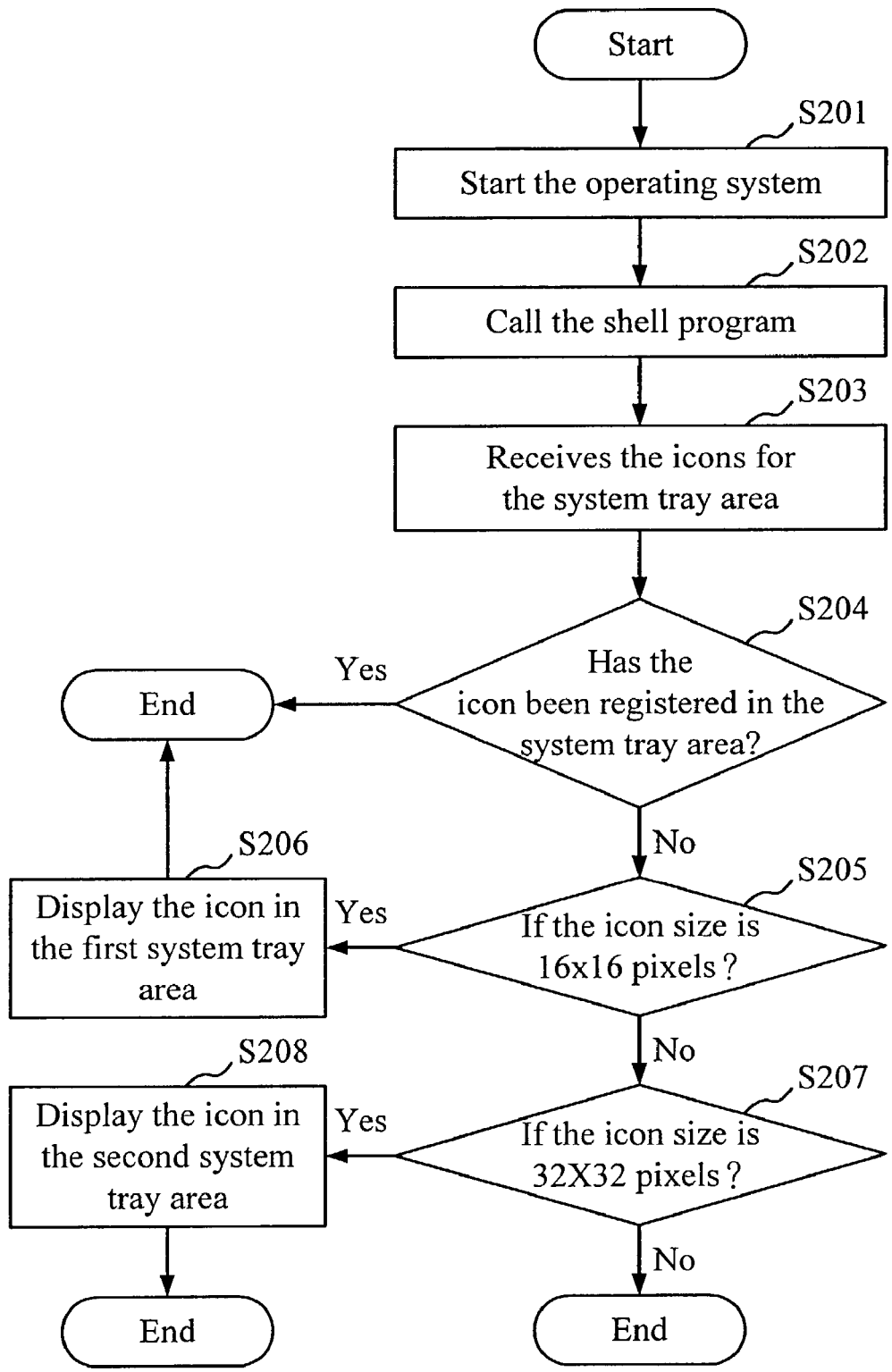
FIG. 2 is a flowchart of implementing a plurality of system tray areas according to an embodiment of the present invention.
Figure 3:
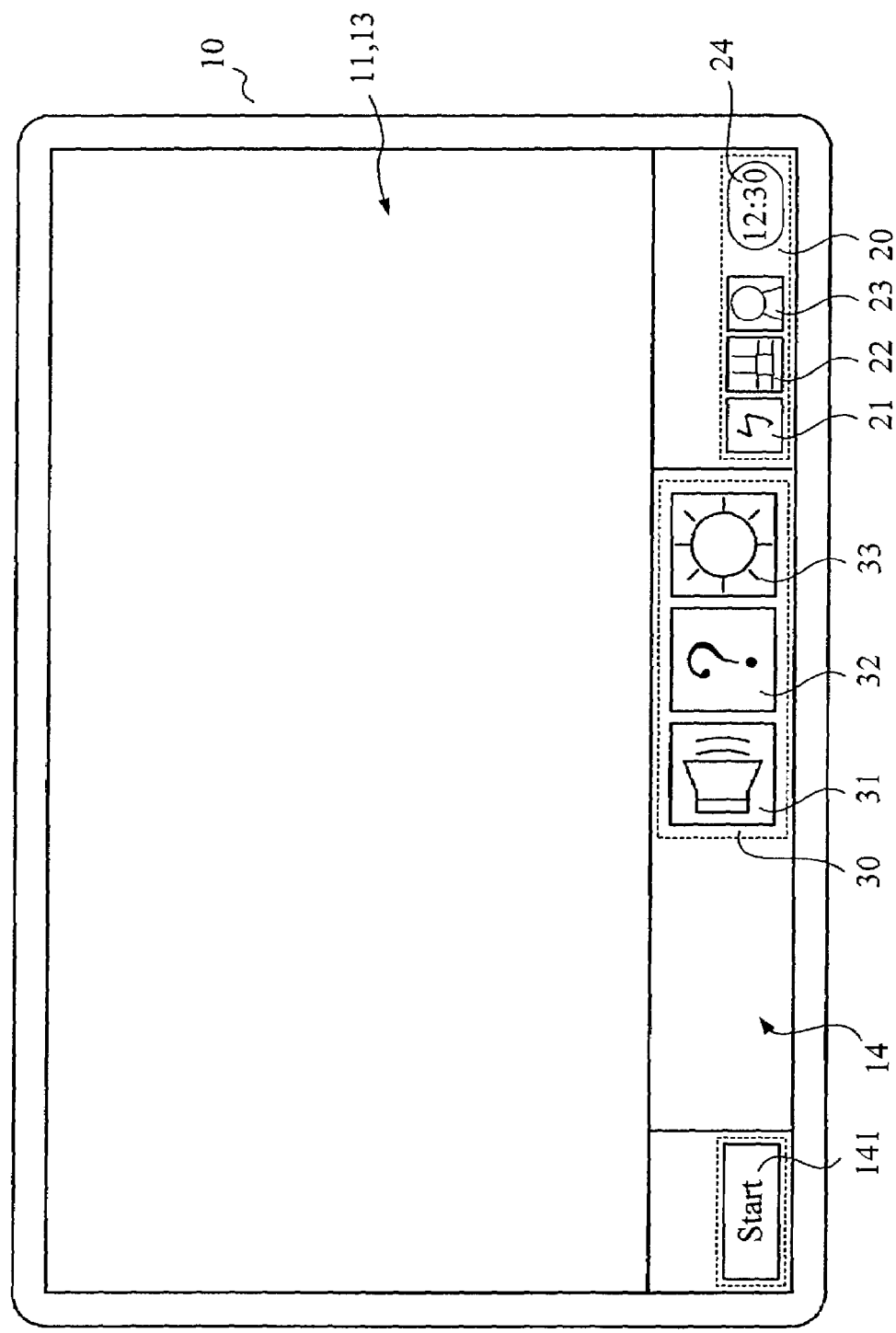
FIG. 3 is a schematic drawing of a plurality of system tray areas according to an embodiment of the present invention.

Please refer to FIG. 2 and FIG. 3. FIG. 2 is a flowchart of implementing system tray areas 20, 30 according to an embodiment of the present invention. FIG. 3 is a schematic drawing of system tray areas 20, 30 according to the embodiment of the present invention. In a practicing environment of the Windows CE.NET operating system, a Shell_NotifyIcon SDK function is provided for a system developer to expand application functionality, so the desktop 13 can define either a preset first system tray area 20 or a second system tray area 30. Different icons are defined for the first system tray area 20 and the second system tray area

30. In addition, the system developer can also define more than two system tray areas as required.

The first system tray area 20 is defined along the right side of a toolbar 14 placed, which is placed along the bottom of the desktop 13, and the first system tray area 20 displays three small icons 21, 22 and 23 with 16×16 pixel sizes, and comprises a time displaying area 24. The above-mentioned icons can be clicked on to respectively execute corresponding system tray programs; the user can click on the small icon 21 to display input device status, click on the small icon 22 to monitor a network connection state, and click on the small icon 23 to monitor an online chatting state, etc. Furthermore, a start menu 141 is usually placed on the left side of the toolbar 14 to enable the user to select the starting menu 141 to start or execute software. However, the deposition of any icon, area or function menu in the toolbar 14 can be adjusted by the system developer, and is not limited by FIG. 3.

The second system tray area 30 is also defined in toolbar 14, and is placed on the left side of the first system tray area 20. The second system tray area 30 displays large icons 31, 32, 33 with 32×32 pixel sizes. The above-mentioned icons can be clicked on to respectively execute corresponding system tray programs; the user can click on the large icon 31 to control volume settings, click on the large icon 32 to provide usage help, and click on the large icon 33 to adjust brightness of the pen-based panel 11. The second system tray area 30 can be displayed at any coordinate point on the desktop according to the system engineer's design, and is not limited to the toolbar 14. Furthermore, the icons can execute more than the above-mentioned three functions, which can also be set by the user. The icon size can be 20×20 pixels, 25×25 pixels, etc. Due to the objective of the embodiment, the second system tray area 30 is larger (ex. 1 to 5 times larger) than the first system tray area 20.

In order to accurately display icons in the corresponding system tray area, when the tablet PC 10 is turned on, the Windows CE.NET operating system is first started (step 201) to call the explorer.exe shell program (step 202). Although the first system tray area 20 and the second system tray area 30 are predefined in the Shell_NotifyIcon SDK function, the areas on the desktop 13 for displaying the first system tray area 20 and the second system tray area 30 are blank before the operating system is started. Then, an application interface receives (or calls) the icons for the first system tray area 20 and the second system tray area 30 (step 203) one by one, and in this manner the icons are registered.

For example, the small icon 21 is not registered in the second system tray area; the application interface decides which system tray area (step 204) that the small icon 21 is to be displayed in by determining the size of the small icon 21. Since the size of the small icon 21 is 16×16 pixels (step 205), which indicates that the small icon 21 is to be drawn in a memory space for the 16×16 pixels defined by the first system tray area 20. So, the small icon 21 is displayed (step 206) and registered in the first system tray area 20.

For the same reason, if the large icon 31 needs to be registered, the application interface determines the size of the icon (step 204). Since the large icon 31 is 32×32 pixels in size, and (step 205) not 16×16 pixels in size (step 207), the large icon 31 is displayed in the second system tray area 30 (step 208). According to the above-mentioned steps, if the icon size does not match any icon sizes for all system tray areas defined by the Shell_NotifyIcon SDK function, this icon will not be able to be displayed in any system tray area, and the registration operation will fail. Furthermore, in step 204, if the icon has been registered in the system tray area such, as the small icon 21 or the large icon 31, the system will stop the registration process and no subsequent determining process will occur.

Figure 4:
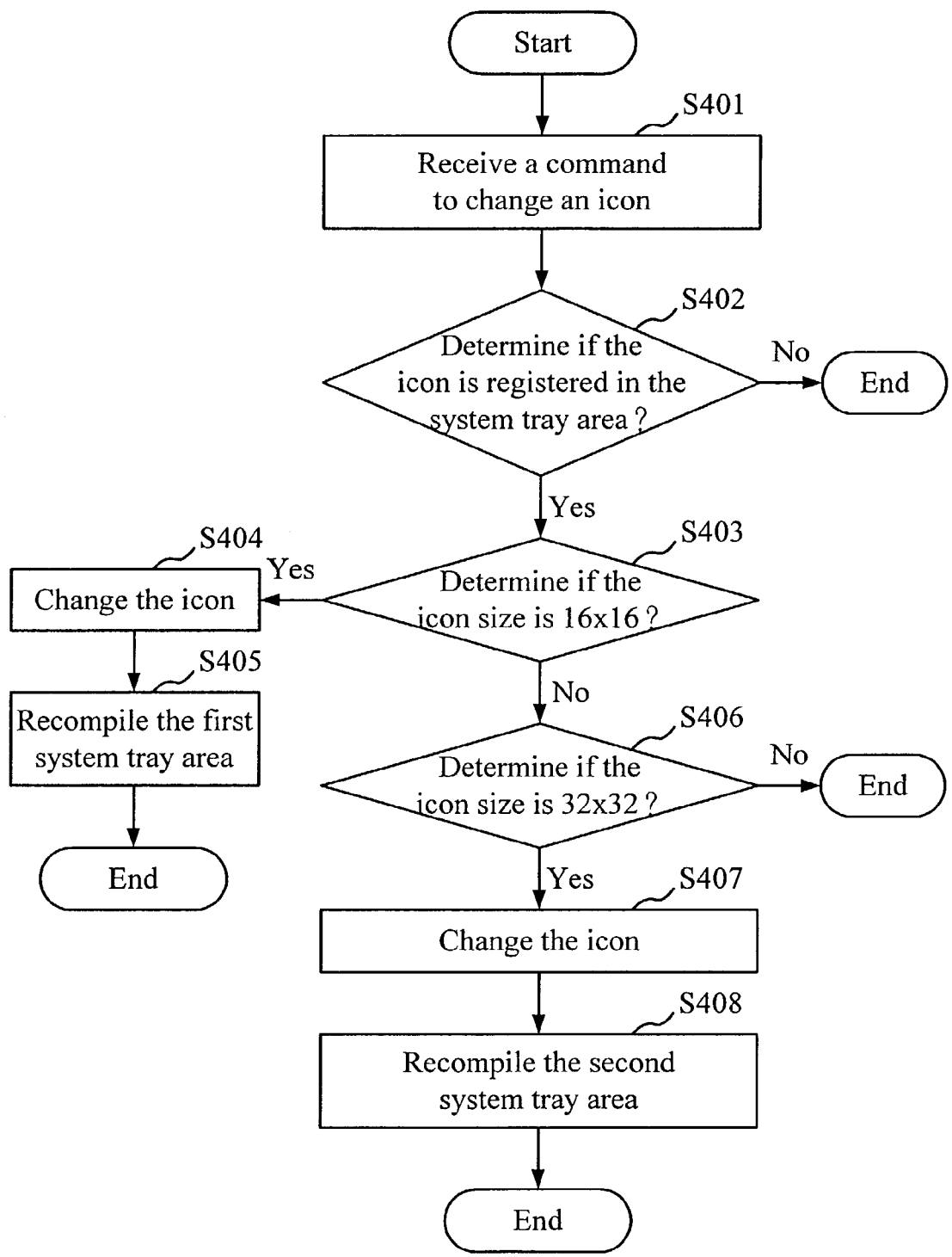
FIG. 4 is a flowchart of a modification step according to an embodiment of the present invention.

Moreover, the system engineer can also change a registered icon, as shown in FIG. 4. When the application interface receives a command to change an icon (step 401), the application interface will determine if the icon is registered in the system tray area 20, 30 (step 402); then it will determine if the icon size is 16×16 (step 403) or 32×32 (step 406). If the icon size does not match a defined icon size in the Shell_NotifyIcon SDK function, the change command is considered invalid. If the icon size matches a defined icon size from the Shell_NotifyIcon SDK function, the defined icon size and a corresponding system tray area will be found, and the change command is considered valid (step 404 or step 407), which change command can be: replacing an old icon with a new icon, or modifying an original icon. When the icon is changed, the corresponding system tray area is recompiled (step 405 or step 408).

Figure 5:
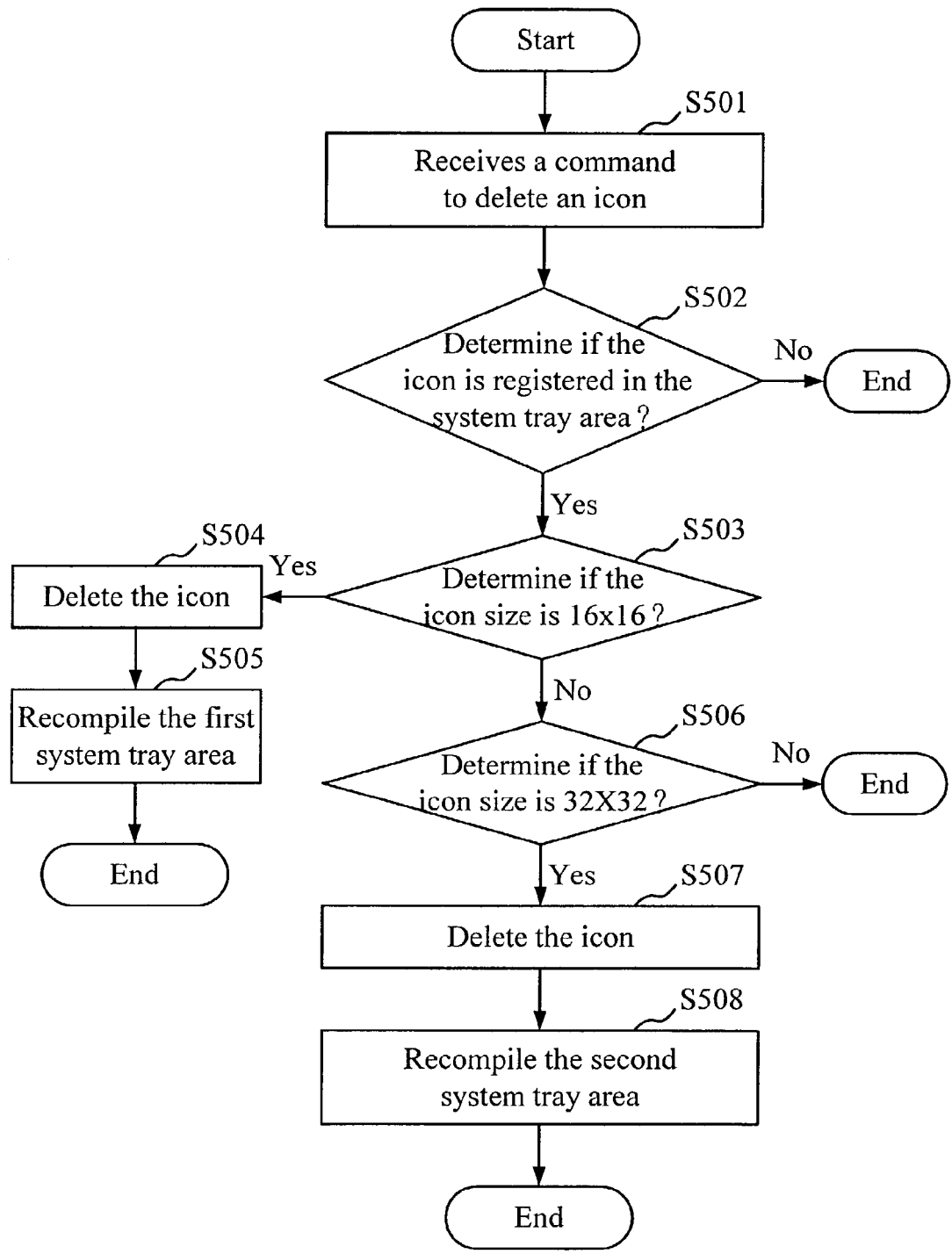
FIG. 5 is a flowchart of a deletion step according to an embodiment of the present invention.

The system engineer can further delete the registered icon. Please refer to FIG. 5. The flowchart in FIG. 5 is similar to the one in FIG. 4, but replaces the change command with a deleting command. Therefore, no further explanation is required.

According to the method of the present invention, two or more system tray areas can be displayed on the desktop by executing the function/program in the shell program, and the icon, icon size and the corresponding application displayed in the system tray area are adjustably defined. For the user, since the new icon size is larger than the preset icon size of 16×16 pixels, it is much easier to use the touch pen or a finger to select the larger icon. Furthermore, the icons for every system tray area can be adjusted, instead of all being displayed in the system tray areas, which can reduce confusion and improve practicality.

The above-mentioned steps can be written as a software program in any suitable computer language, and be compiled or assembled for execution. The software program can be stored on any recording media that can be recognize and decoded by a processing unit, or any product comprising such a recording media. The recording media can be a hard disk, a floppy disk, an optical disk, a ZIP disk, an MO, an IC chip, RAM, or any other known product. As all of the detailed steps are completely described, there is no need for further explanation.

Although the present invention has been explained in relation to its preferred embodiment, it is to be understood that many other possible modifications and variations can be made without departing from the spirit and scope of the invention as hereinafter claimed.

What is claimed is:

1. A method of implementing a plurality of system tray areas, wherein each system tray area is defined with a particular size and used for displaying a plurality of registered icons to enable a user to select one icon to execute a corresponding system tray function, a first system tray area having a size that is larger than the size of a second system tray area, the method comprising:
   (A) initiating installation of an operating system in a computer system, wherein the computer system has a shell program, the shell program being used for interpreting and executing a command given from a user of the operating system;
   (B) calling the shell program; and
   (C) executing the shell program to enable a display of the computer system to display at least two system tray areas, step (C) further comprising:

(C1) receiving an icon to be registered with the system tray areas;

(C2) determining whether the icon is registered with the system tray areas;

(C3) finding a corresponding particular size for the icon and defining a system tray area with this corresponding particular size; and (C4) displaying the icon in the system tray area and displaying the system tray area on the display.

2. The method as claimed in claim 1, wherein the size of the first system tray area is 1 to 5 times larger than the size of the second system tray area.

3. The method as claimed in claim 1, wherein the shell program comprises:

(D1) receiving an icon to be modified;

(D2) determining whether the icon to be modified is registered with the system tray area;

(D3) finding a corresponding particular size for the icon and defining a system tray area with this corresponding particular size; and (D4) modifying the icon and recompiling the system tray area.

4. The method as claimed in claim 1, wherein the shell program comprises:

(E1) receiving an icon to be deleted;

(E2) determining whether the icon to be deleted is registered with the system tray area;

(E3) finding a corresponding particular size for the icon and defining a system tray area with this corresponding particular size; and (E4) deleting the icon and recompiling the system tray area.

5. A computer readable recording medium storing a software program for implementing a plurality of system tray areas, wherein the each system tray area is defined with a particular size and used for displaying a plurality of registered icons to enable a user to select one icon to execute a corresponding system tray function, and a size of a first system tray area is greater than a size of a second system tray area, the software program comprising program code for executing the following steps:

a first program code for initiating installation of an operating system in a computer system, wherein the computer has a shell program, and the shell program is used for interpreting and executing a command given from the user on the operating system;

a second program code for calling the shell program; and a third program code for executing the shell program to enable a display of the computer system to display at least two system tray areas, wherein the third program code further comprises program code to execute the following steps:

a third A program code for receiving an icon to be registered with the system tray areas;

a third B program code for determining whether the icon is registered with the system tray areas;

a third C program code for finding a corresponding particular size for the icon and defining a system tray area with this corresponding particular size; and a third D program code for displaying the icon in the system tray area and displaying the system tray area on the display.

6. The recording medium as claimed in claim 5, wherein the shell program further comprises program code for executing the following steps:

a fourth A program code for receiving an icon to be modified;

a fourth B program code for determining whether the icon to be modified is registered with the system tray area;

a fourth C program code for finding a corresponding particular size for the icon and defining a system tray area with this corresponding particular size; and a fourth D program code for modifying the icon and recompiling the system tray area.

7. The recording medium as claimed in claim 5, wherein the shell program further comprises program code for executing the following steps:

a fifth A program code for receiving an icon to be deleted;

a fifth B program code for determining whether the icon to be deleted is registered with the system tray area;

a fifth C program code for finding a corresponding particular size for the icon and defining a system tray area with this corresponding particular size; and a fifth D program code for deleting the icon and recompiling the system tray area.

* * * * *